United States Patent [19]

Peterson

[11] 4,293,257
[45] Oct. 6, 1981

[54] TENSION INDICATING WASHER

[75] Inventor: Francis C. Peterson, St. Charles, Ill.

[73] Assignee: Illinois Tool Works Inc., Chicago, Ill.

[21] Appl. No.: 130,670

[22] Filed: Mar. 17, 1980

[51] Int. Cl.³ .................... F16B 31/02; F16B 39/24
[52] U.S. Cl. .................................... 411/11; 411/156
[58] Field of Search .............. 85/62; 151/38, 35; 116/327, 331, 319; 73/761; 411/11, 10, 9, 8, 156

[56] References Cited

U.S. PATENT DOCUMENTS

| | | | |
|---|---|---|---|
| 1,774,695 | 9/1930 | Baynes | 85/62 |
| 2,830,486 | 4/1958 | Dillon | 85/62 |
| 3,060,731 | 10/1962 | Adise | 85/62 X |
| 3,072,093 | 1/1963 | Lanius, Jr. | 85/62 X |
| 3,104,645 | 9/1963 | Harrison | 85/62 X |
| 3,153,974 | 10/1964 | Canning | 85/62 |
| 3,169,440 | 2/1965 | Taylor | 85/62 |
| 3,329,058 | 7/1967 | Cumming | 85/62 |
| 3,736,394 | 5/1973 | Rumbaugh | 85/62 X |
| 3,945,704 | 3/1976 | Kraus et al. | 85/62 X |
| 4,000,681 | 1/1977 | Coldren | 85/62 |
| 4,047,463 | 9/1977 | Coldren | 85/62 |
| 4,131,050 | 12/1978 | Holmes | 85/62 |
| 4,149,446 | 4/1979 | Spengler et al. | 85/62 X |
| 4,164,164 | 8/1979 | Trungold | 85/62 |

Primary Examiner—Ramon S. Britts
Attorney, Agent, or Firm—Richard K. Thomson; Thomas W. Buckman

[57] ABSTRACT

A washer for indicating the amount of load placed on a fastener joint. A disc-like body has a pair of arms extending outwardly and then upwardly from two elbow portions. These two arms will deflect toward one another and, when a predetermined load is reached, they will touch. Any loosening occurring within the joint will result in the arms disengaging contact presenting an immediate visual indication.

3 Claims, 7 Drawing Figures

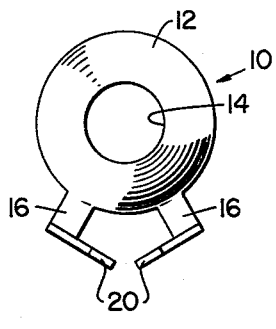
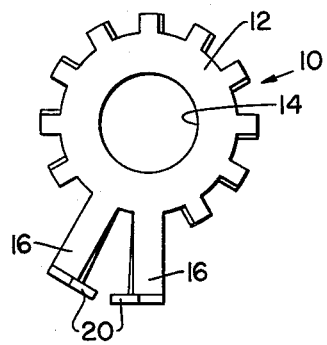
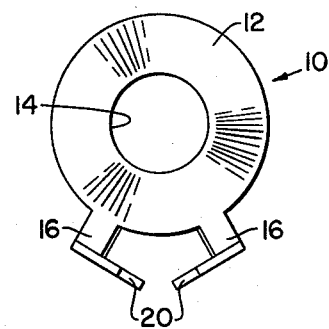
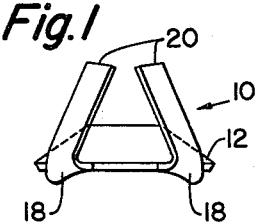
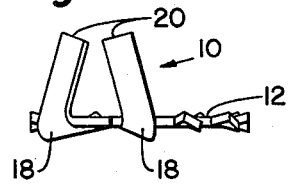
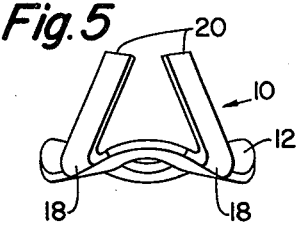
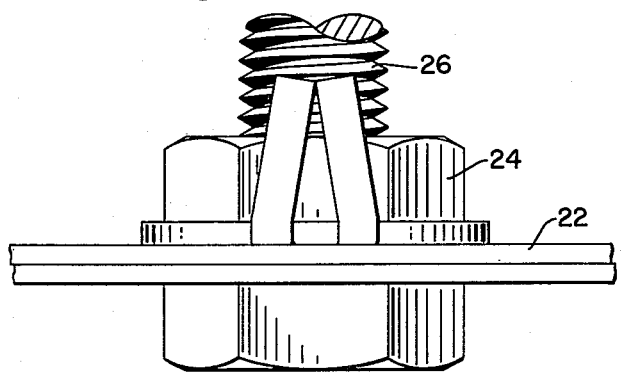

TENSION INDICATING WASHER

SUMMARY OF THE INVENTION

Many attempts have been made to develop a suitable device for indicating the amount of tension placed on a bolt or screw used to fasten two or more elements together (i.e., the amount of load placed on the joint). Some of these devices are complex which makes them both difficult and costly to manufacture. Other such devices require special electrical connections in order to monitor the load. Yet others, because of their configuration, are suitable only for determining the magnitude of the initial loading and are incapable of acting as a continuous monitor.

The tension indicating washer of the present invention provides a simple continuous monitoring system for determining whether or not the joint is properly loaded. A pair of arms project outwardly from a disc-shaped body and then upwardly from elbows. The outermost extremities of the two arms will deflect toward one another as the joint is loaded and will touch when the proper predetermined tension is achieved. The deflection takes place as a result of the twist in the arms in the vicinity of the elbows or, due to the domed configuration of the washer body or, a combination of the two. Any reduction in the loading of the joint will result in the resilient arms disengaging giving an immediate visual indication of loosening of the joint.

These and other features, objects and advantages of the present invention will become apparent following a reading of the appended specification and the accompanying drawings.

BRIEF DESCRIPTION OF THE DRAWINGS

FIG. 1 is a side elevational view of the washer of the present invention embodied in a concial washer;

FIG. 2 is a top view of the washer in FIG. 1;

FIG. 3 is a side elevational view of the washer of the present invention embodied in a lock washer;

FIG. 4 is a top view of the washer of FIG. 3;

FIG. 5 is a side elevational view of the washer of the present invention embodied in a wave washer;

FIG. 6 is a top view of the washer of FIG. 5;

FIG. 7 is a schematic side elevation of the washer of FIG. 5 in operative engagement in a joint.

DETAILED DESCRIPTION OF THE INVENTION

The tension indicating washer of the present invention is shown generally at 10. The washer can take any desired form. For example, the washer can be a conical washer as depicted in FIGS. 1 and 2, a lock washer as in FIGS. 3 and 4, or a wave washer as depicted in FIGS. 5 and 6.

Many of the features, as well as the basic manner of operation, are common to each of the washers, regardless of the washer configuration. A circular, generally disc-like body portion 12 has a fastener receiving aperture 14. The body 12 has a pair of arms 16 projecting outwardly therefrom. Each arm 16 has an elbow 18 from which the outermost extremity 20 of each arm extends generally upwardly. The arms 16 may be twisted in the region of the elbow so that the portions of the elbows which are on the outside edges of the arms extend below the base of the washer. Each of the conical and wave washers, in addition, have what may be described as a domed body configuration.

FIG. 7 indicates, generally schematically, the configuration of the wave washer (FIGS. 5 and 6) as it would appear clamped between a workpiece 22 and a nut 24. This is the same general configuration that the conical (FIGS. 1 and 2) and lock (FIGS. 3 and 4) washers would take in clamped position. Bolt 26 projects through apertures in the two workpieces, aperture 14 in the washer, and then is threadingly engaged by nut 24. As the nut is tightened onto bold 26, the outermost extremities 20 of arms 16 rotate toward each other for two reasons: first, the flattening of the wave causes the outer portions of the arms to approach each other; and, second, as the outer portions of elbows 18 contact the upper surface of workpiece 22, they cause the outer extremities 20 to be twisted toward one another. When the proper predetermined tension is achieved, outer extremities 20 will be brought into touching engagement. If subsequently, the joint should loosen, the extremities 20 will separate due to the resilience of the washer, giving a clear visual indication that the nut needs retightening. It will be understood that in order for the washer to function in this spring-like manner, the load must be applied and released as is the case with any spring.

The embodiments of FIGS. 1, 2 and 3, 4 generally function similarly to that described above. In the FIGS. 1, 2 embodiment, however, in place of the wave collapse, the conical body 12 collapses. This flattening will cause some deflection of outer extremities 20 toward the aperture 14. Because arms 16 extend generally radially of the washer body, this deflection will bring the arms closer together augmenting the rotation caused by the elbows engaging workpiece 22. The lock washer of FIGS. 3, 4 has a generally flat configuration with arms 16 comprising extensions of two adjacent teeth. Because the washer is flat, deflection of outer extremities 20 will occur solely due to the configuration of the arms. Hence, it is necessary that the arms 16 be longer than in the other embodiments in order to compensate.

The predetermined tension can be arrived at by varying a number of parameters. Such factors as the material used, thickness of material, case hardness of the washer, length of arms 16, height of the wave or cone, and amount of twist in the arm, are all variables which can be regulated to determine what the predetermined tension causing closing of the arms will be.

Various changes, modifications and alternatives will become apparent from reading the foregoing specification. For example, a flag or the like may be held between the two extremities whereby loosening of the joint will cause an even more dramatic indication in the form of the dropping of the flag. Further, it will be appreciated that although FIG. 7 shows the washer used with a nut/bolt combination, the washer of the present invention can be used equally well beneath the head of a bolt or self-tapping fastener. Accordingly, it is intended that all such changes, modifications and alternatives as are covered by the appended claims be included in the present invention.

I claim:

1. A tension indicating washer to indicate a predetermined loading in a joint, said washer comprising an annular disc-like body portion having first and second opposed faces with said second face defining a bearing surface, said body portion having an aperture adapted for receiving the shank of a threaded fastener; a pair of arm members projecting outwardly from the outer periphery of said body portion, each said arm having an elbow and an outer extremity extending in a direction axially away from bearing surface from said elbow to a position above said first face of said body portion; each elbow having a circumferentially inner and a circumferentially outer section, said circumferentially inner sections being adjacent each other, the circimferentially outer section of each elbow being displaced to a horizontal plane below the horizontal plane of said circumferentially inner section such that as tension is applied to the joint, the elbow will cause rotation of at least a portion of each arm so that the outer extremities thereof will approach each other and will touch when the predetermined proper loading is achieved in the joint.

2. The tension indicating washer of claim 1 wherein the washer is comprised of a resilient material whereby loosening of the joint below the predetermined loading will cause the outer extremities of the arms to disengage.

3. The tension indicating washer of claim 1 wherein the means for causing rotation of at least a portion of each arm includes a domed configuration of the body portion, which augments the rotation caused by said elbows.

* * * * *